United States Patent
Mellor

(10) Patent No.: US 7,334,813 B2
(45) Date of Patent: Feb. 26, 2008

(54) MOTOR VEHICLE OCCUPANT PROTECTION

(75) Inventor: Michael Mellor, Birmingham (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/073,391

(22) Filed: Mar. 4, 2005

(65) Prior Publication Data

US 2005/0173903 A1    Aug. 11, 2005

Related U.S. Application Data

(63) Continuation of application No. PCT/GB03/03609, filed on Aug. 18, 2003.

(30) Foreign Application Priority Data

Aug. 18, 2003   (GB)   .................... 0220520.1

(51) Int. Cl.
*B60R 21/21* (2006.01)
(52) U.S. Cl. .................................. 280/730.2
(58) Field of Classification Search ............. 280/730.2, 280/730.1
See application file for complete search history.

(56) References Cited

U.S. PATENT DOCUMENTS

| 5,277,441 A | 1/1994 | Sinnhuber |
| 5,307,896 A * | 5/1994 | Taguchi et al. ............ 180/274 |
| 5,482,344 A | 1/1996 | Walker et al. |
| 5,749,600 A | 5/1998 | Yamada et al. |
| 5,793,005 A * | 8/1998 | Kato .................... 200/61.45 R |
| 6,302,436 B1 | 10/2001 | Eyrainer |
| 2002/0109341 A1 | 8/2002 | Eckert et al. |

FOREIGN PATENT DOCUMENTS

| DE | 19608239 A1 | 9/1997 |
| DE | 19820567 A1 | 11/1999 |
| EP | 0523704 B1 | 9/1995 |
| EP | 1043197 B1 | 7/2004 |

OTHER PUBLICATIONS

Search Report, dated Nov. 29, 2002, Application No. GB 0220520.1, 2 pages.
International Search Report, dated Dec. 12, 2003, Application No. PCT/GB03/03609, 4 pages.

* cited by examiner

*Primary Examiner*—Faye M. Fleming
(74) *Attorney, Agent, or Firm*—Frank A. MacKenzie; Brooks Kushman P.C.

(57) ABSTRACT

A motor vehicle (11) has a side door (14) having a side panel assembly (15) fitted with a pusher block arrangement (25) comprising an outer block (26) and an inner block (27). A pelvic airbag (35) is positioned between the side door (14) and the occupant (31) of a seat (16). In the event of an impact of sufficient severity, the pusher block arrangement pushes a trim panel (22) towards the seat while the pelvic airbag (35) is inflated between the trim panel and the pelvic region of the occupant to react the inertia loads on the occupant caused by the impact. A thorax airbag (41) is also inflated at the same time as the pelvic airbag (35) to support the thorax region of the occupant.

18 Claims, 7 Drawing Sheets

MOTOR VEHICLE OCCUPANT PROTECTION

CROSS-REFERENCE TO RELATED APPLICATIONS

This application is a continuation of International Application No. PCT/GB 03/03609, filed Aug. 18, 2003, which claims priority to Great Britain Application No. 0220520.1, filed Sep. 4, 2002.

This invention relates to motor vehicles and in particular to a motor vehicle having improved occupant protection against side impacts.

It has been proposed, e.g. in U.S. Pat. No. 5,482,344, to mitigate the possibility of injury to vehicle occupants by adding blocks to the interior surface of a side door, the blocks being pushed towards the pelvic region of a seated occupant in the event of a side collision. While the so-called pelvic pushers can be very effective, there is an increasing demand for even more occupant protection which cannot always be met by a pelvic pusher alone. On the other hand, it is also known, e.g. from U.S. Pat. No. 5,277,441 and EP-A-1043197, to use airbags to protect the pelvic region of an occupant. Again, such airbags can be effective but there is an inevitable delay in their deployment and such deployment usually depends on the side impact being of a sufficient level of severity to warrant deployment, e.g. by using an inertia switch set at a particular lateral acceleration.

It is an object of this invention to provide a motor vehicle with improved occupant protection in the event of a side impact.

According to the invention there is provided a vehicle having a body defining a passenger compartment, the body including a side panel assembly comprising an outer panel, an inner panel connected to the outer panel, a trim panel mounted on the inner panel and a pusher block arrangement having an outer end face positioned immediately adjacent the outer panel and an inner end face positioned immediately adjacent the trim panel, the trim panel, at least in the region of the pusher block arrangement, being movable in a direction away from the inner panel, a seat mounted within the passenger compartment in close proximity to the side panel assembly, the pusher block arrangement being aligned with the pelvic region of an occupant of the seat and arranged to be displaced towards the occupant when the outer panel is deformed due to an impact upon the side panel assembly, and an airbag which, when inflated in the event of an impact upon the side panel assembly, expands into a volume between the trim panel and the pelvic region of the occupant so as to transfer load between the pusher block arrangement and the pelvic region of the occupant.

Conveniently, the pusher block arrangement comprises an outer block arrangement and an inner block arrangement arranged in tandem. This allows for the selection of different collapse properties of the blocks.

The inner panel may have an aperture and the inner block arrangement includes a pusher block which extends through the aperture. Alternatively, the inner panel, at least in the region of the pusher block arrangement, may be arranged to be movable towards the occupant when impacted by the outer block arrangement.

The pusher block arrangement may comprise an energy absorbing member, e.g. made from a foam material.

The invention will now be described by way of example with reference to the accompanying drawings, of which:

Figure 1:
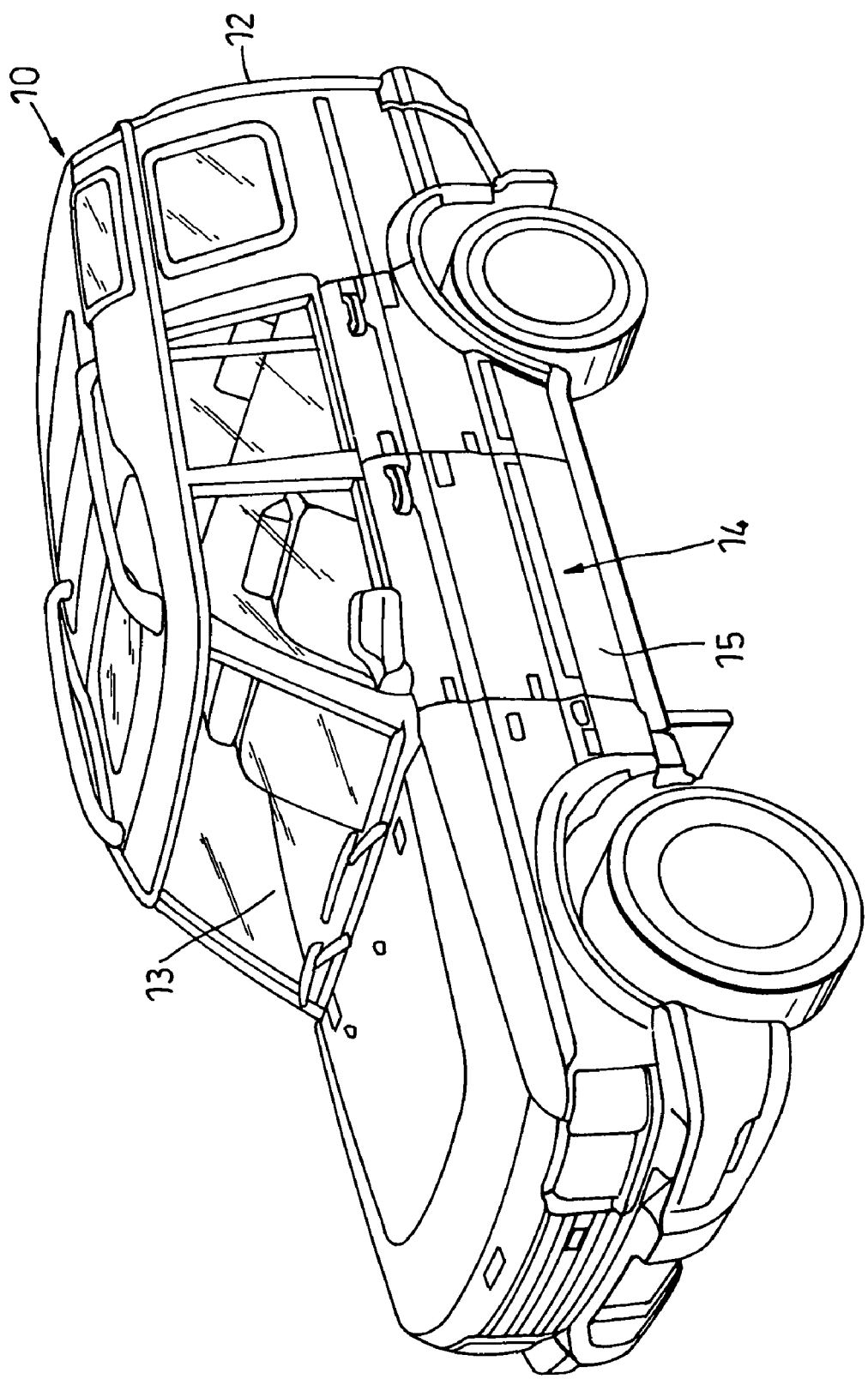
FIG. 1 is a perspective view of a motor vehicle according to the invention.
Figure 2:
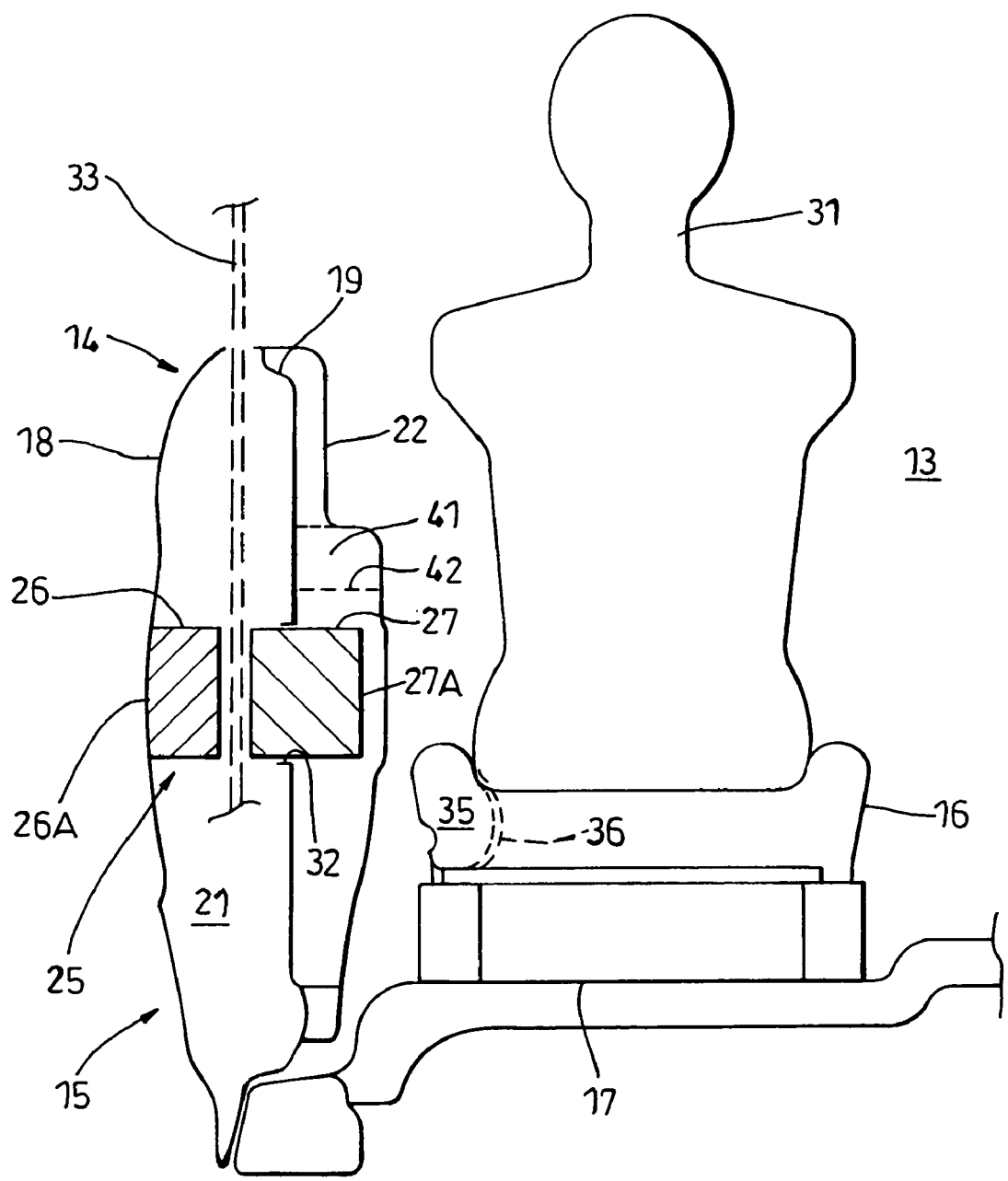
FIG. 2 is a cut-away view of part of the vehicle shown in FIG. 1 in a normal use configuration.
Figure 3:
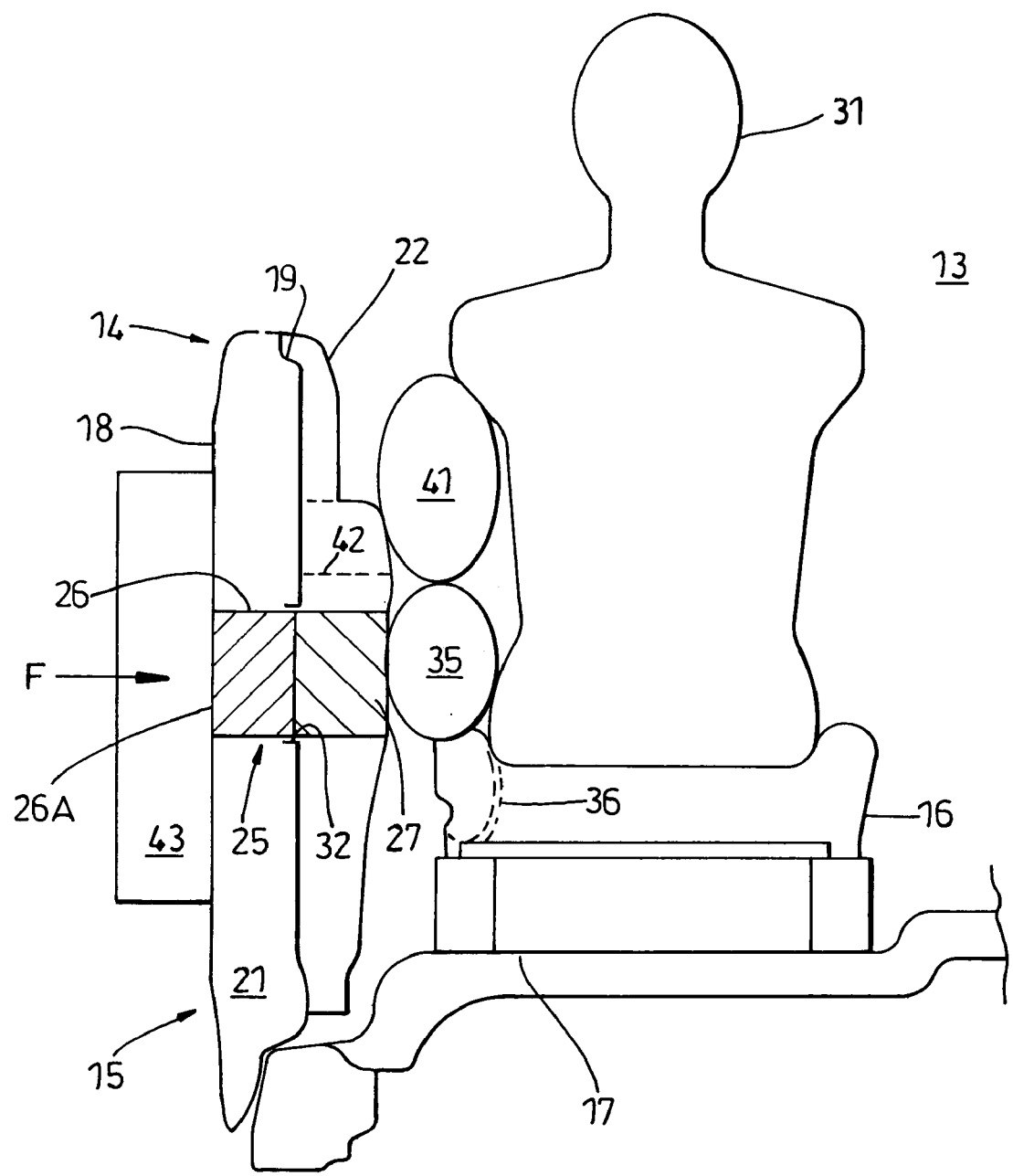
FIG. 3 is a view based on FIG. 2 showing the effect of a side impact.
Figure 4:
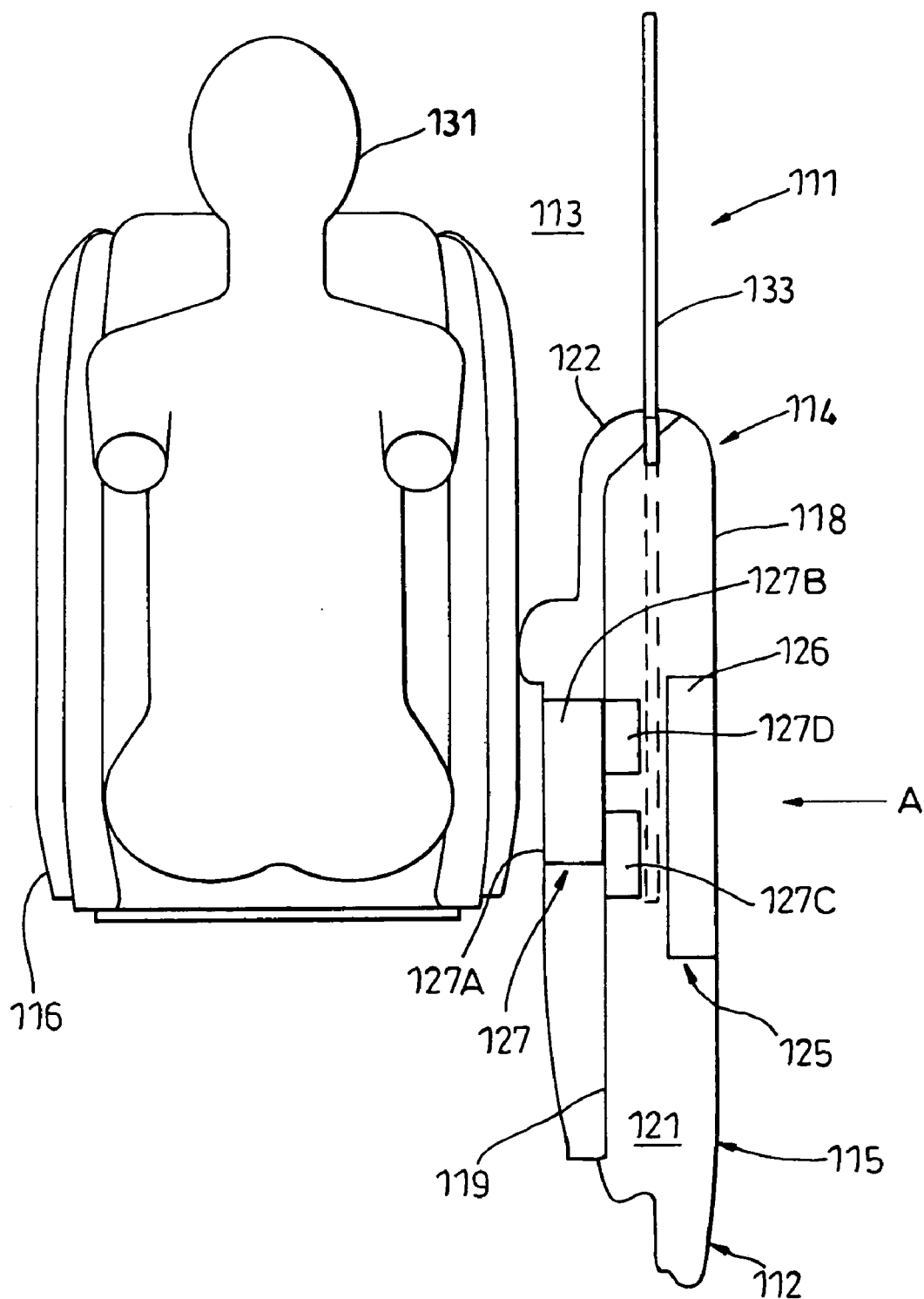
FIG. 4 is a cut-away view similar to FIG. 2 showing a modification.
Figure 5:
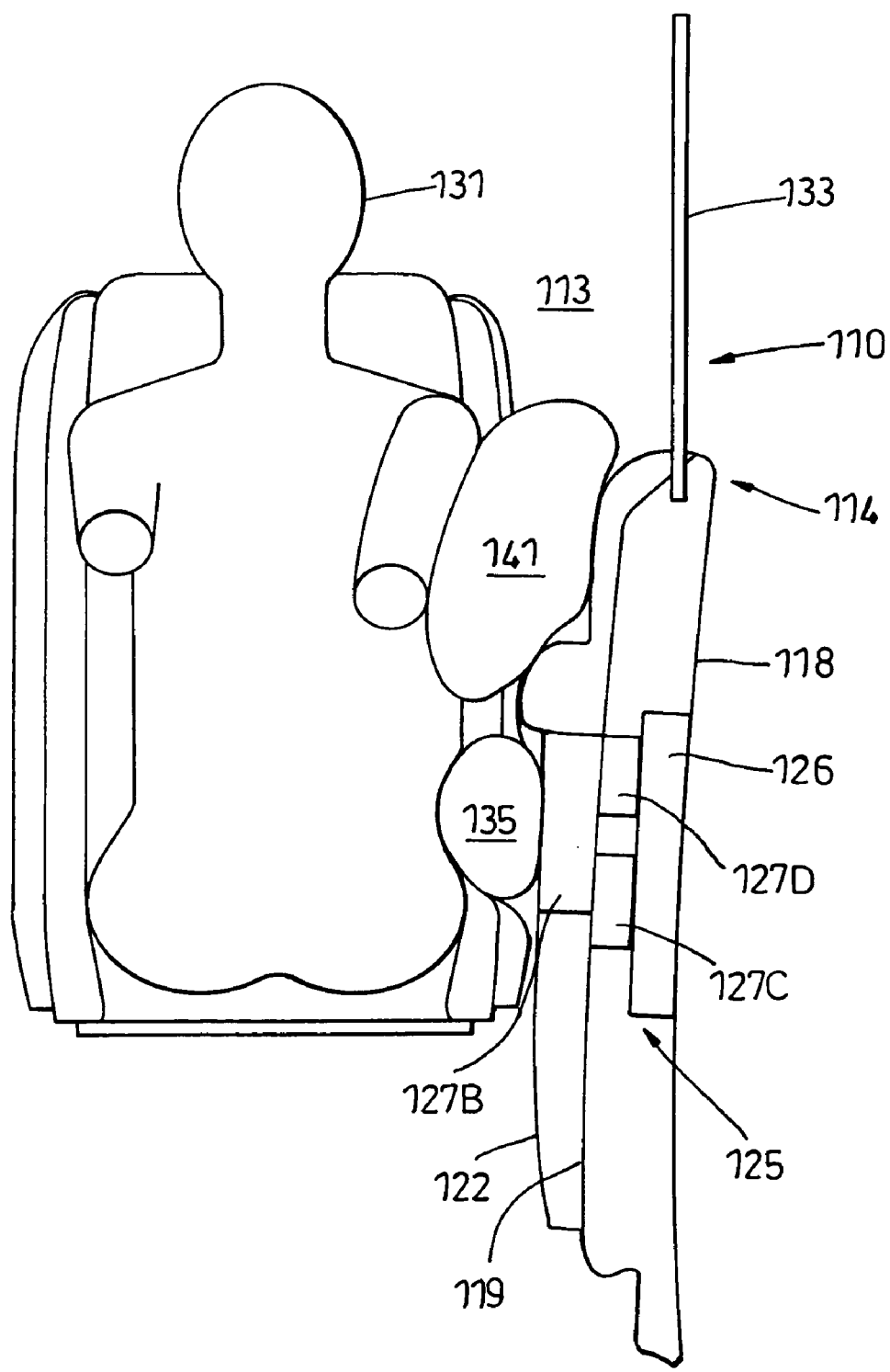
FIG. 5 is a view based on FIG. 4 showing the effect of a side impact.
Figure 6:
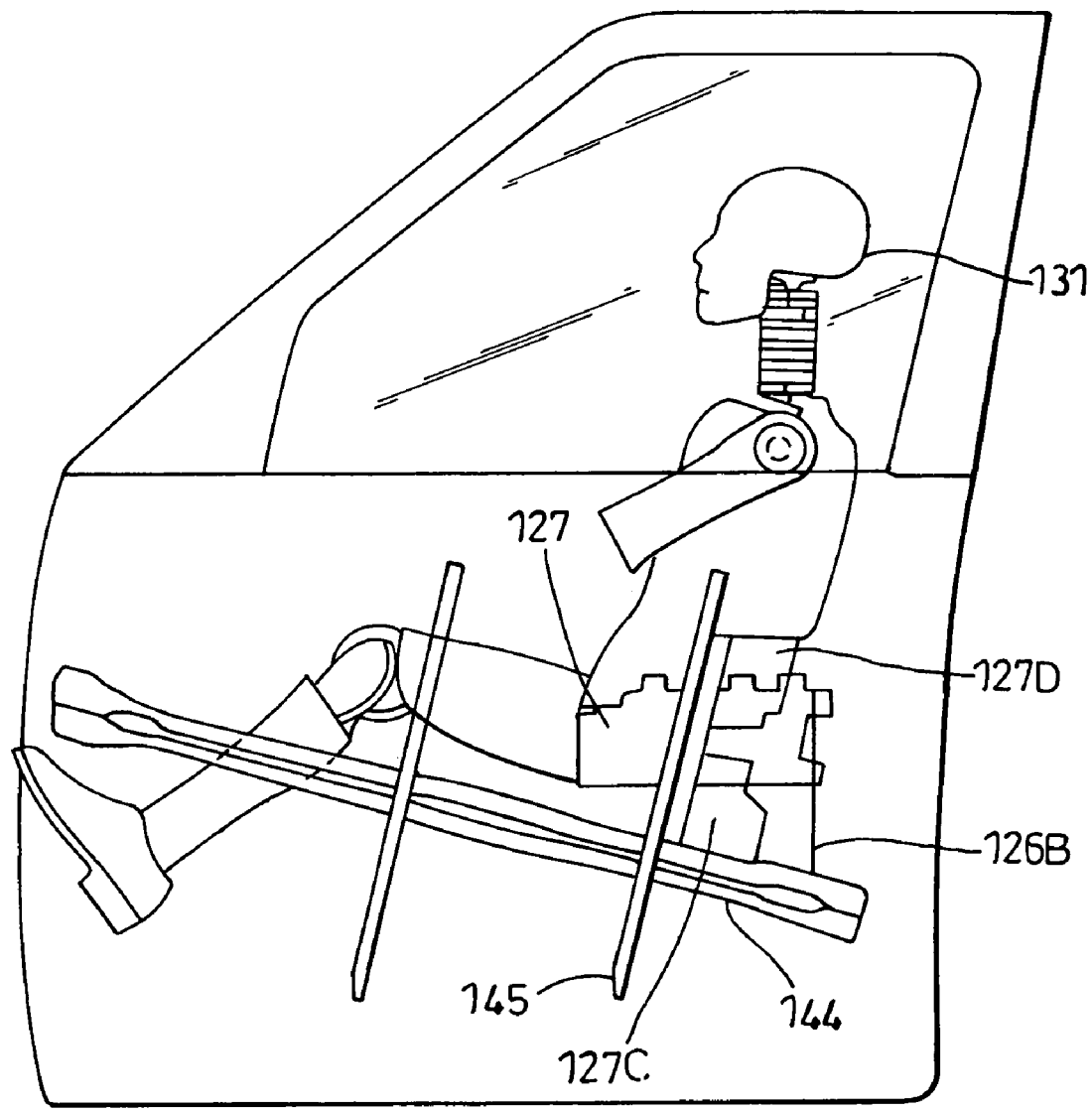
FIG. 6 is a diagrammatic side view in the direction of arrow A in FIG. 4.
Figure 7:
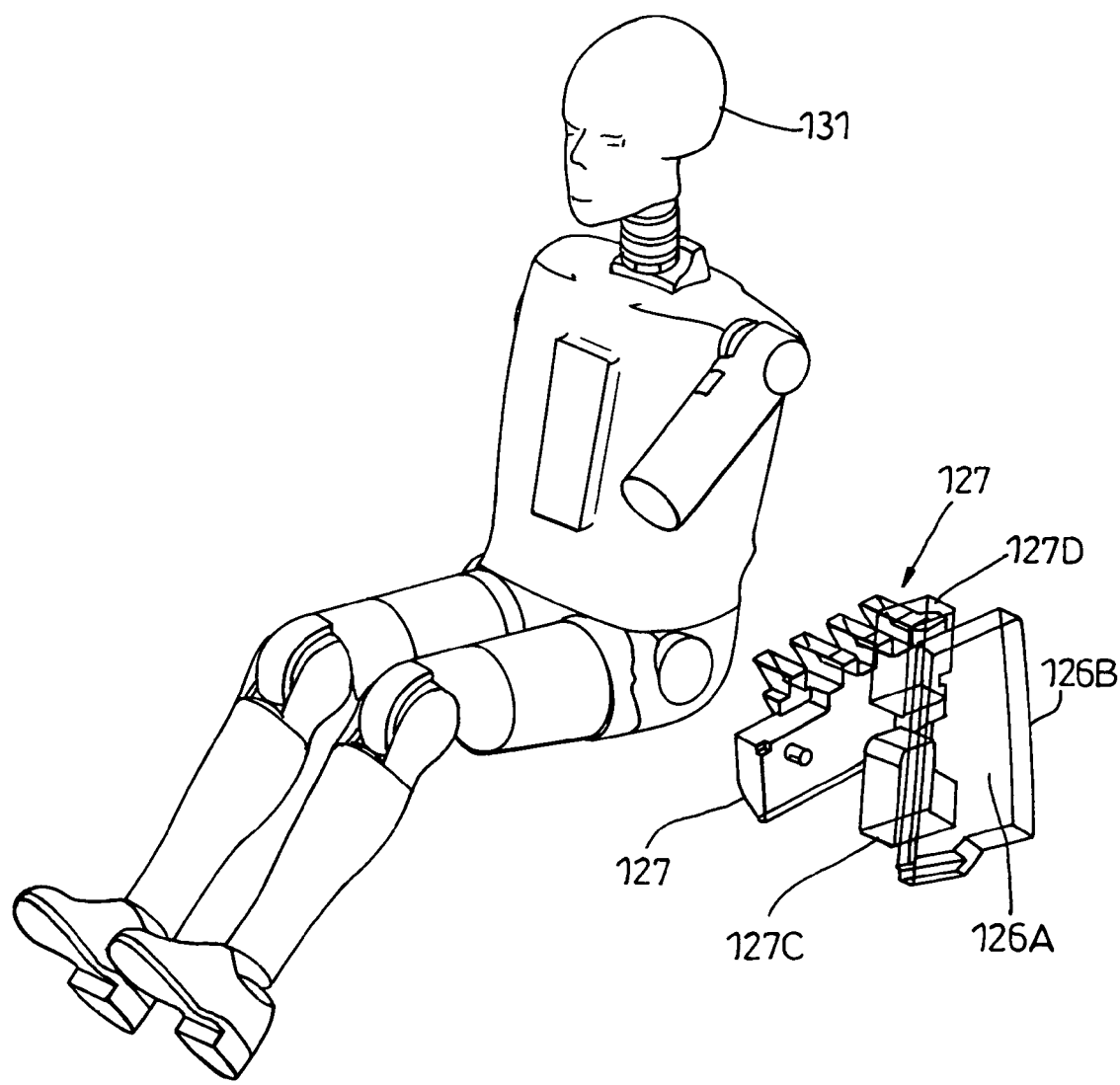
FIG. 7 is a diagrammatic perspective view showing a vehicle occupant and pusher block arrangement shown in FIGS. 4 to 6.

With reference to FIGS. 1 to 3, a motor vehicle 10 has a body structure 12 which defines a passenger compartment 13, a hinged side door 14 permitting access to and from the passenger compartment. A seat 16 is mounted to a floor 17 of the passenger compartment 13 in close proximity to the side door 14. The side door 14 comprises an outer panel 18, an inner panel 19 connected to the outer panel 18 to define a door cavity 21 and a trim panel 22 mounted on the inner panel 19.

The door 14 also includes a pusher block arrangement 25 having an outer end face 26A positioned immediately adjacent the outer panel 18 and an inner end face 27A positioned immediately adjacent the trim panel 22. The pusher block arrangement 25 is mounted within the cavity 21 and is aligned with a pelvic region of an occupant 31 sat on the seat 16, the pusher block arrangement 25 being arranged to be displaced towards the occupant 31 when the outer panel 18 is deformed due to an impact on the door 14. The term "aligned" in this context means that the pusher block arrangement 25 is positioned such that it is able to transfer force from the outer panel 18 to the pelvic region of the occupant 31.

The pusher block arrangement 25 comprises two separate components, an outer block 26 and an inner block 27 arranged in tandem, i.e., one in front of the other. In the example illustrated by FIGS. 2 and 3 there is only one outer block 26 and only one inner block 27 but there could be more than one outer block 26 and more than one inner block 27 and the term "block" will be understood to include an arrangement of blocks. The inner block 27 extends through an aperture 32 in the inner door panel 19 and, as shown, the outer block 26 is fastened directly to the outer door panel 11, e.g. by adhesive. However, the outer block 26 could be supported in some other way, e.g. by brackets or straps, so that there is a small gap between the outer end of the outer block 26 and the outer panel 18. This would avoid the possibility of there being any distortion of the outer panel caused by the outer block 26. Similarly, instead of the inner block 27 being held in an aperture 32 in the inner door panel, it could be made up of two blocks on each side of a inner panel having a panel section which is sufficiently flexible to move under the side impact load. By using two separate components to form the pusher block arrangement 25 it is possible to leave a gap between the inner end of the outer block 26 and the outer end of the inner block 27 to allow for the passage of a drop-down window glass 33.

In this example, the inner and the outer members 14, 15 of the pusher block arrangement 25 are energy absorbing members made from a foam material. However it will be appreciated that the inner member only could be an energy absorbing member, e.g. made from an appropriate foam material, and the outer block 26 need not be energy absorbing. Typically an appropriate foam material is expanded polypropylene and the density chosen carefully to provide the required collapse characteristics. As previously mentioned, there could be more than one outer block 26 and more than one inner block 27 and the sizes and foam densities can be varied to help the achievement of these characteristics. The number of blocks may also be determined by a need to avoid obstructions within the door cavity 21, e.g., a regulator for the window glass 33 and links and motors for a door latch mechanism. Also, the number and cross-sectional area of the blocks as viewed in profile from the side of the vehicle 10 would be chosen & varied to suit the required collapse characteristics, the range of seating positions (e.g. fore and aft adjustment and height adjustment) and the anticipated range of sizes and weights of the occupants.

An airbag, conveniently referred to as the pelvic airbag 35, is attached to part of the seat 16 and is stored in a housing 36 (shown in dotted outline) fixed to the seat 16 on the side of the seat 16 nearest the door 14 and in the proximity of the pelvic region of the occupant 31. The vehicle also includes a second airbag, conveniently referred to as the thorax airbag 41 positioned to inflate between the thorax region of the occupant 31 and the side door 14. For the purpose of illustration, the thorax airbag 41 is shown stored in a housing 42 fastened to the inner panel 19 for deployment through a break-out opening in the trim panel 22. However, the thorax airbag 41 is preferably stored in a seat backrest of the seat 16 along with the pelvic airbag 35. In the particular case of a front seat, this allows for fore and aft adjustment of the seat and, in the case of the thorax airbag 41, rake adjustment also.

Operation of the pusher block arrangement 25 and the airbags 35, 41 can be best understood with reference to FIG. 3. This shows the effect of a side impact, e.g. as from being struck by an object, shown diagrammatically at 43, which creates an impact force indicated by the arrow 'F' on the door 14 in the region of the pusher block arrangement 25. The outer panel 18 is deformed inwards towards the seat 16, causing the outer block 26 to move towards the inner block 27. If the severity of the impact is below a certain level, the deformation of the outer panel 18 will not be sufficient to cause the outer block 26 to contact the inner block 27. However, beyond this level of impact the inner block 27 will contact the trim panel 22 and will push the trim panel 22 towards the occupant 31, causing the trim panel 22 to yield by becoming at least partially disengaged from the inner panel 19.

The vehicle 11 is fitted with one or more sensors (not shown) to send signals to an electronic controller (not shown). In the event of an impact of sufficient severity, a signal is sent from the or each sensor indicating to the controller that the airbags 16, 17 need to be inflated. When a gas generator (not shown) connected to the pelvic airbag 35 is energised it causes the pelvic airbag 35 to be inflated so as to expand into a volume between the trim panel 22 and the pelvic region of the occupant 31 so as to transfer load from the inner block 27 of the pusher block arrangement 25 to the pelvic region of the occupant 31 and thereby react the inertia loads on the occupant 31 caused by the impact. The thorax airbag 41 is also inflated at the same time as the pelvic airbag 35 to support the thorax region of the occupant 31.

By using a combination of the pusher block arrangement 25 and the pelvic airbag 35 it is possible to reduce the effect of a side impact on an occupant to a greater extent than is normally possible using a pusher block arrangement alone or a thorax airbag or arrangement of airbags alone. One reason for this relates to the time frame of an impact. The pusher block arrangement 25 has an immediate effect since the blocks 26, 27 move with the panels 18, 19 as the impact occurs and while the lateral acceleration is still increasing to the level required to trigger inflation of the airbags 35, 41. Having moved towards the seat 16, the pusher block arrangement 25 provides an abutment for the pelvic airbag 35 to react against, minimising the inflated volume of the airbag 35 and the time needed to reach the inflated condition. The gap between the outer and inner blocks can be varied to allow for the time for the pelvic airbag to deploy.

In the modification shown in FIGS. 4 to 7, parts which are the same as or identical to those shown in FIGS. 1 to 3 carry the same reference but with the addition of 100. Generally, the arrangement of pusher blocks and pelvic and thorax airbags 135, 141 is as shown in FIGS. 2 and 3, the major difference being that instead of a single inner block 27 there is an arrangement of blocks indicated at 127 and comprising an inner block 127B and two intermediate blocks 127C and 127D. The shape and positioning of the outer block 126 is influenced by the presence of a side impact beam 144 and by a window glass guide rail. There is more freedom of choice for positioning the inner block 127B which, in this modification, is carried on the trim panel 122 so that there is no need for an aperture in the inner panel 119, the inner panel having sufficient flexibility to move towards the occupant 131 when the block arrangement 126 is pushed by a side impact. The two intermediate blocks 127C and 127D are carried on the inner door panel 119, two blocks being required to allow the passage of a cable (not shown).

Although the invention has been described with respect to a single side door it will be appreciated that the vehicle has four side doors, each of which could include a pusher block arrangement and a pelvic airbag for inflation in the event of a side impact. Also, instead of the trim panel becoming partially disengaged from the inner panel by the pusher block arrangement, the trim panel could simply be flexible to the extent of being movable in a direction away from the inner panel under the side impact situation described. Alternatively, the trim panel may have an aperture or a break-out pane for the inner end of the inner block to burst through. Furthermore, the pelvic airbag may be combined with the thorax airbag, either as a separate airbag in a common housing or as a dual chamber pelvic and thorax airbag. Indeed, although the pelvic airbag is housed in the seat it could be housed in any other convenient location such as in a backrest of the seat, within a side pillar forming part of the body structure of the motor vehicle or within the door cavity.

In the case where a seat is not alongside a door, e.g. as in a second row seat in a two-door vehicle or third row seat in a four door vehicle, then the pusher arrangement might be included in the adjacent bodyside structure and trim rather than in the door trim while the pelvic airbag would be in the seat or the side trim as previously described.

The invention claimed is:

1. A vehicle (11, 111) having:
   a body (12, 112) defining a passenger compartment (13, 113), the body including a side panel assembly (15, 115) comprising an outer panel (18, 118), an inner panel (19, 119) connected to the outer panel, a trim panel (22, 122) mounted on the inner panel and a pusher block arrangement (25, 225) having an outer end face (26A, 126A) positioned immediately adjacent the outer panel and an inner end face (27A, 127A) positioned immediately adjacent the trim panel, the trim panel, at least in the region of the pusher block arrangement, being movable in a direction away from the inner panel;
   a seat (16, 116) mounted within the passenger compartment (13, 113) in close proximity to the side panel assembly (15, 115), the pusher block arrangement (25, 125) being aligned with the pelvic region of an occupant (31, 131) of the seat and arranged to be displaced towards the occupant when the outer panel (18, 118) is deformed due to an impact upon the side panel assembly; and an airbag (35, 135) which, when inflated in the event of an impact upon the side panel assembly (15, 115), expands into a volume between the trim panel (22, 122) and the pelvic region of the occupant (31, 131) so as to transfer load between the pusher block arrangement (25, 125) and the pelvic region of the occupant.

2. A vehicle as claimed in claim 1 in which the pusher block arrangement (25, 125) comprises an outer block arrangement (26, 126) and an inner block arrangement (27, 127) arranged in tandem.

3. A vehicle as claimed in claim 2 in which the inner panel (19, 119) has an aperture (32, 132) and the inner block arrangement includes a pusher block (27, 127) which extends through the aperture.

4. A vehicle as claimed in claim 2 in which the inner panel (19, 119), at least in the region of the pusher block arrangement (25, 125), is arranged to be movable towards the occupant (31, 131) when impacted by the outer block arrangement (26, 126).

5. A vehicle as claimed in any of claims 2 to 4 in which the side panel assembly (15, 115) comprises a drop-down window glass (33, 133) and there is a gap between the outer block arrangement (26, 126) and the inner block arrangement (27, 127) to allow the window glass to drop down into the gap.

6. A vehicle as claimed in claim 1 in which the pusher block arrangement (25) comprises an energy absorbing member (26).

7. A vehicle as claimed in claim 6 in which the energy absorbing member (26, 126; 27, 127) is made from a foam material.

8. A vehicle as claimed in claim 1 in which the airbag (35, 135) is attached to part of the seat (16, 116).

9. A vehicle as claimed in claim 8 in which the seat (16) includes a housing (36) for the airbag.

10. A vehicle as claimed in claim 1 and further comprising a second airbag (41, 141) positioned to expand into a volume between the thorax region of the occupant (31) and the side panel assembly (15).

11. A vehicle as claimed in claim 1 and further comprising a side door (14, 114) and in which the side panel assembly (15, 115) is part of the side door.

12. An occupant protection system for a vehicle having a seat, a trim panel and a side panel assembly, wherein the side panel assembly includes an outer panel being connected to an inner panel, the system comprising:

a pusher block arrangement having an outer end face and an inner end face, the outer end face being positionable immediately adjacent to the outer panel and the inner end face being positionable immediately adjacent the trim panel, the trim panel, at least in the region of the pusher block arrangement, being movable in a direction away from the inner panel;

wherein the pusher block arrangement is aligned with a pelvic region of an occupant within the seat and arranged to be displaced towards the occupant when the outer panel is deformed due to an impact upon the side panel assembly; and an airbag that is expandable into a volume between the trim panel and the pelvic region so as to transfer a load between the pusher block arrangement and the pelvic region.

13. A vehicle as claimed in claim 12 in which the pusher block arrangement (25, 125) comprises an outer block arrangement (26, 126) and an inner block arrangement (27, 127) arranged in tandem.

14. A vehicle as claimed in claim 13 in which the inner panel (19, 119) has an aperture (32, 132) and the inner block arrangement includes a pusher block (27, 127) which extends through the aperture.

15. A vehicle as claimed in claim 13 in which the inner panel (19, 119), at least in the region of the pusher block arrangement (25, 125), is arranged to be movable towards the occupant (31, 131) when impacted by the outer block arrangement (26, 126).

16. A vehicle as claimed in claim 1 in which the pusher block arrangement (25) comprises an energy absorbing member (26).

17. A vehicle as claimed in claim 2 in which the inner block arrangement comprises:

an at least one inner block interposed between the inner panel and the trim panel; and an at least one intermediate block disposed adjacent the inner panel opposite the at least one inner block.

18. A vehicle as claimed in claim 13 in which the inner block arrangement comprises:

an at least one inner block interposed between the inner panel and the trim panel; and an at least one intermediate block disposed adjacent the inner panel opposite the at least one inner block.

\* \* \* \* \*